Oct. 10, 1950  J. MIHALYI  2,525,558
PARALLAX FREE MULTIPLE VIEW FINDER
Filed Jan. 27, 1948  2 Sheets-Sheet 1
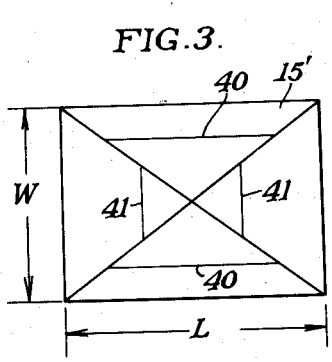
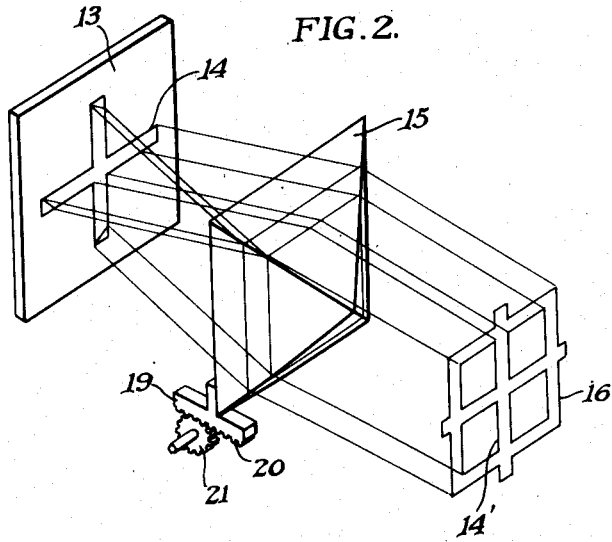
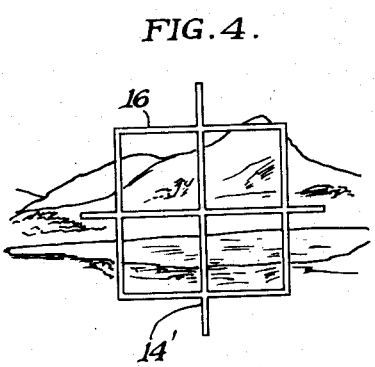
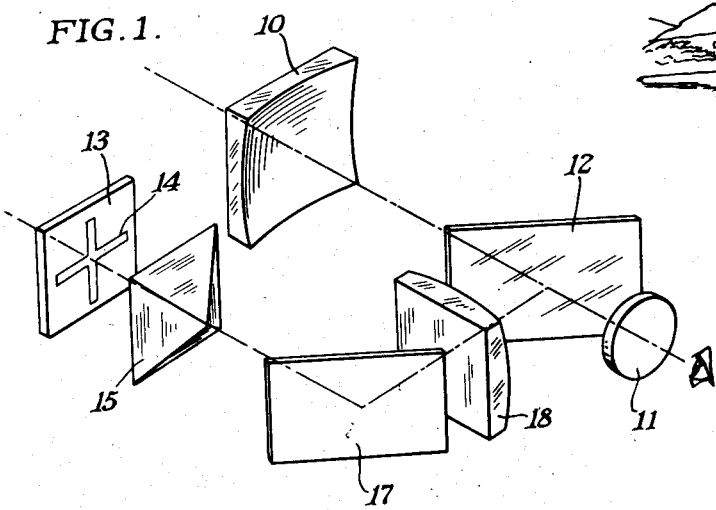
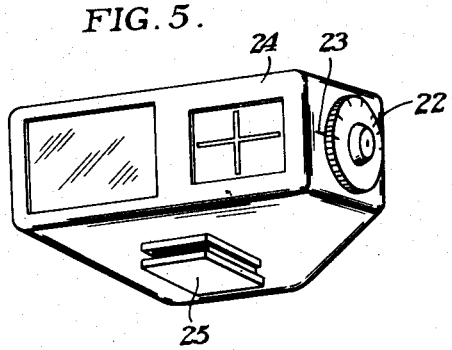
JOSEPH MIHALYI
INVENTOR
BY
ATTORNEYS Oct. 10, 1950     J. MIHALYI     2,525,558
PARALLAX FREE MULTIPLE VIEW FINDER
Filed Jan. 27, 1948     2 Sheets-Sheet 2

JOSEPH MIHALYI
INVENTOR
BY
ATTORNEYS

Patented Oct. 10, 1950

2,525,558

UNITED STATES PATENT OFFICE 2,525,558

PARALLAX FREE MULTIPLE VIEW FINDER

Joseph Mihalyi, Rochester, N. Y., assignor to Eastman Kodak Company, Rochester, N. Y., a corporation of New Jersey Application January 27, 1948, Serial No. 4,568

8 Claims. (Cl. 88—1.5)

The present invention relates to view finders for cameras, and particularly to a view finder which has a variable field-limiting frame to adapt the same for use on a camera using interchangeable lenses of different focal length and one which is free of parallax.

The primary object of the present invention is to provide a view finder having a field-limiting frame which is optically produced and which can be varied in size to correspond with the field of the objective being used on the camera by the axial movement of one of the optical members.

Another object is to provide a view finder having a field-limiting frame which can be varied in size in accordance with, and in proportion to, the size of the movable element.

A further object is to provide a view finder in which the field-limiting frame is formed by a pyramidal prism imaging a reticle in the form of an illuminated cross and in which movement of the prism to and from the reticle changes the size of the field-limiting frame.

And still another object is to provide a view finder of the type set forth wherein the size of the field-limiting frame is proportional to the size of the base of the prism.

And yet another object is to provide a view finder of the type set forth wherein the prism has a base, one dimension of which is longer than the other and wherein the two faces of the prism, having the longest dimension, are corrugated so that the rectangle imaged thereby in any one of the several positions of adustment of the prism will have its four sides joined at the corners.

Another object is to provide a view finder of the type set forth wherein the field-limiting frame is formed by an optical system separate from the sighting optical system and the two are combined so that the image of the field frame will appear at the same point in space as the image of the camera target so that no parallax will be introduced.

Another object is to provide a camera view finder having a brilliant field-limiting frame which is longer in one dimension than the other and is formed by imaging a cross-shaped reticle through a pyramidal prism whose longer faces are corrugated so as to result in the cross being imaged as a rectangle joined at its corners.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings, in which Fig. 1 is an enlarged perspective view of the optical parts making up a camera view finder system constructed in accordance with one embodiment of the present invention;

Fig. 2 is an enlarged perspective view illustrating how a square pyramidal prism forms an image of a cross as a square to be used as the limiting frame in the finder;

Fig. 3 is a plan view of a rectangular prism with the refracted lines of the reticle shown therein to illustrate what would happen to the frame image if the base of the pyramid prism were longer in one dimension than the other as distinguished from being square;

Fig. 4 illustrates the type of view as seen in the ocular of the finder system of Fig. 1;

Fig. 5 is a perspective view showing how the unit might look if the finder system is enclosed in a housing to be detachably connected to the top of a camera;

Like reference characters refer to corresponding parts throughout the drawing.

Figure 6:
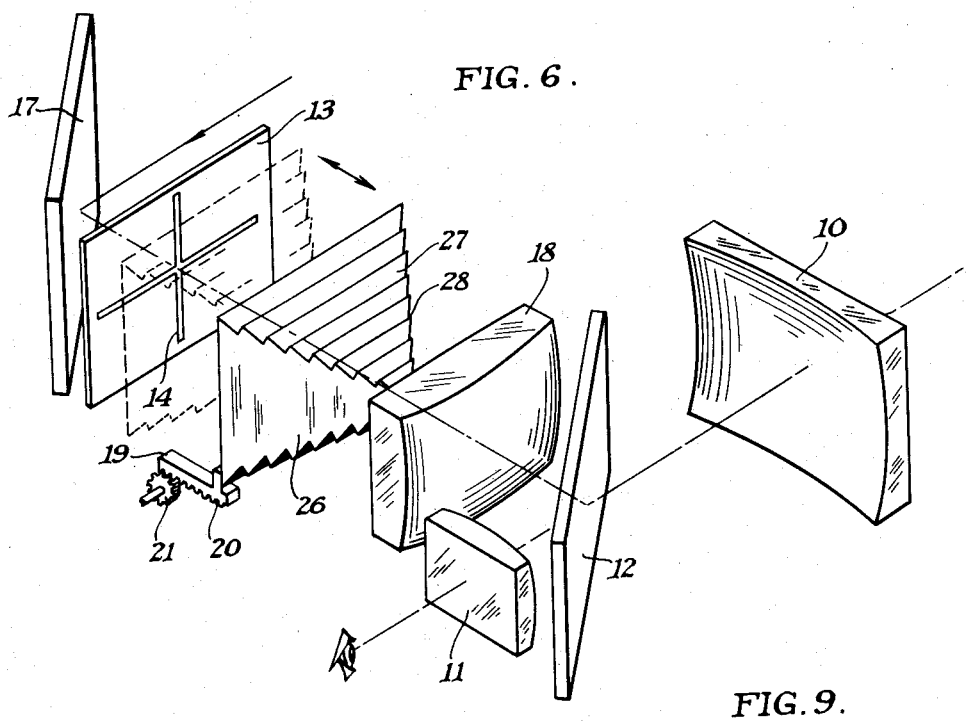
Fig. 6 is an enlarged perspective view of another modification of the view finder system and one particularly adapted for use on cameras requiring a field frame which is longer in one dimension than the other.

Coming now to the modification of the camera view finder shown in Fig. 1, the optics of the sighting system comprise a negative field lens 10 and an ocular or eye lens 11 with a half-tone mirror 12 disposed between the two at 45° to their optical axis. This sighting system is thus one of the negative type wherein the camera target is viewed as a virtual image in front of the negative field lens and the light rays from this image passing to the ocular have slight divergence.

A mirror or other opaque member 13 is mounted adjacent to, and laterally spaced from, the field lens 10 and hav two lines cut through the reflecting layer to form a cross 14 which is centrally located and constitutes the reticle of the field-limiting frame defining system. Light from the camera target enters only where the reflecting layer is removed and constitutes the means for illuminating the reticle. The cross of light is refracted on passing through the square pyramidal prism 15 so that the prism forms the virtual image of a square 16 with a cross 14', as shown in Fig. 2. As will be evident from an inspection of Fig. 2, the top and bottom faces of the prism refract the horizontal line of the cross by equal amounts on either side of the optical axis of the system to form the top and bottom of the square 16, while the side faces of the prism refract the vertical line of the cross by equal amounts to form the sides of the square. The cross itself appears directly because it passes through the axis of the prism without refraction.

The refracted square then becomes the field-limiting frame and the image of said frame is directed into the half-tone mirror 12 by the mirror 17 and lens 18 which projects the frame image into the virtual image plane of the target being viewed in the sighting system so that the system is free from parallax. The view, as seen through the ocular, will appear as shown in Fig. 4 wherein the limiting frame 16 and the cross 14' appear as brilliant lines clearly visible over the lightest parts of the camera target.

In a negative type sighting system, such as that disclosed, the negative field lens 10 forms a virtual image of the target in front of itself which the ocular 11 projects to the eye. Thus, the image-forming rays from this virtual image passing to the ocular have a divergence as they pass through the half-tone mirror and the power of the lens 18 is made such that the light rays from the prism and passing therethrough have the same divergence as they leave the half-tone mirror as do the rays emanating from the virtual image of the target and passing to the ocular. Consequently, the frame image and target image are observed as being in the same plane and parallax is thereby avoided.

If the negative sighting system is replaced by a common telescope system where a positive field lens would form a real image of the target at a point behind the half-tone mirror and in front of the ocular, then the image-forming rays passing through the half-tone mirror would be converging. Accordingly, to eliminate parallax in the combined systems the lens 18 should then be made of such power and so positioned that the rays from the prism projected thereby would have a convergence at the half-tone mirror equal to that of the rays coming from the field lens of the sighting system. In other words, depending upon the type of optical system used in the target sighting system, the power and disposition of lens 18 should be such that the image-forming rays from the field lens of the sighting system and the image-forming rays from the lens 18 have the same vergence as they strike the half-tone mirror. Then the combined systems will be free from parallax difficulties.

If the pyramidal prism 15 has a square base, then the prism may be moved axially toward and from the reticle 13 and the square image formed by the prism will vary in size and the four corners of the frame image will remain connected, or joined. As the prism is moved away from the reticle, the frame expands, and, as it moves toward the reticle, the frame contracts. Accordingly this finder system may be used on a camera adapted for interchangeable lenses if the camera is one which gives a square picture. Any suitable means may be provided for adjusting the prism and for purposes of illustration I have shown the prism mounted on a support 19 including a rack portion 20 engaged by a pinion 21. Rotation of the pinion moves the prism axially relative to the reticle, and if the pinion is controlled by a manual control knob 22, calibrated in camera lens focal lengths, then by turning this knob with the aid of an index 23, the size of the field frame of the finder system can be readily adjusted in accordance with the focal length of the lens to be used on the camera (see Fig. 5). In Fig. 5 I have shown the complete system of Fig. 1 mounted in a housing 24 having an attaching clip 25 on the bottom thereof by the use of which the finder can be detachably connected to the range finder clip found on the top of most cameras.

If the pyramidal prism were other than square, the refracted image of the cross 14 would not appear as a closed frame but would appear as a disjoined rectangle, as shown in Fig. 3. In this figure the lines 40 are the refracted images of the horizontal line of cross 14, while the lines 41 are the refracted images of the vertical lines of the cross. This disjoining of the refracted lines of the cross is brought about by the change in the base angle of the sides of the prism resulting from lengthening one side relative to the other and thus changing the extent of refraction of the lines of the cross in the two pairs of prism faces. Consequently, this conventional type of pyramidal prism cannot be used in the frame-defining system where rectangular picture areas are required and, since the majority of cameras take a rectangular picture, the field of use of this system is unduly restricted.

Figure 7:
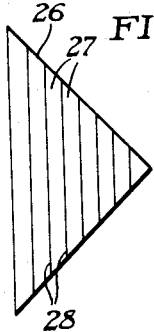
Fig. 7 is an elevational view of the pyramidal prism used in the finder system of Fig. 6 and looking at one of the faces of which are corrugated.
Figure 8:
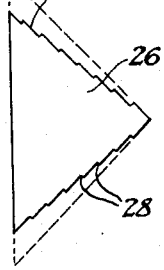
Fig. 8 is an elevational view of the pyramidal prism used in the finder system of Fig. 6 and looking at one of the plane faces thereof to show how one side of the base of the prism is shortened while keeping the light-refracting surfaces of the other prism faces parallel and forming the desired angle with the base to give the rectangular field frame having dimensions of the desired ratio.

In Figs. 7 and 8 I have shown how the pyramidal prism may be constructed to permit it to image a cross into a closed or joined rectangular frame and thus adapt the type of finder system, above described, for use on cameras giving rectangular pictures and, what's more, cameras of this type adapted to use interchangeable lenses where the dimensions of the picture areas vary in size but also in proportion.

As shown in Figs. 7 and 8, the two dimensions of the base of the pyramidal prism 26 is the same as the desired ratio of the dimensions of the limiting field frame, as will be indicated by the camera on which the finder is to be used. Now the two faces of the prism having the longer base dimension are corrugated so as to provide a plurality of plane light-refracting surfaces 27 in the form of steps connected by short risers 28, as indicated in Fig. 8. This permits one dimension of the base of the pyramid to be shortened without causing the base angle of the other two faces from increasing, or, in other words, permits the other two faces of the pyramid to have a base angle of any desired ratio with the base angle of the shortened faces. As clearly shown in Fig. 8, the plane light-refracting surfaces 27 formed by the corrugations are parallel to each other and, in this instance, the sides of the dotted triangle having a base which is the extension of the base of the prism. Accordingly, the plurality of light-refracting surfaces 27 possess the refractive characteristics of a single surface which would lie along the dotted sides of the triangle. The angle which the light-refracting surfaces of the corrugated faces of the prism makes with the base is determined by the ratio of the two dimensions of the base of the prism and, hence, the ratio of the dimensions of the limiting field frame desired.

In other words, in laying out the prism the dimensions of the base thereof are determined by the maximum size of field frame desired and the base angles which the corrugated surfaces have are such that as the pirsm is moved to and from the reticle these surfaces refract the horizontal line of the cross at such a rate with respect to the refraction of the vertical line of the cross by the two plane faces of the prism that the four refracted lines join at the corners in all positions of adjustment to form a closed rectangular limiting field frame. By way of example, if a field frame is desired whose dimensions have a 3-to-4 ratio, then the prism should be made so that its base is rectangular in shape and its two dimensions have a 3-to-4 ratio and is large enough to accommodate the largest sized field frame which will be encountered, and the long faces of the prism should be corrugated so that the light-refracting surfaces 27 thereof make an angle with the base which is three-fourths of the base angle between the plane surfaces of the prism and the base.

Referring now to Fig. 6, I have shown how this corrugated prism may be used in a finder system like that described above. The majority of the parts in this system are the same as those shown in Fig. 1 and will thus be referred to by the same reference character. A primary difference in the two systems consists of a rearrangement of the parts and the substitution of the corrugated prism for the square prism of Fig. 1. In Fig. 6 the camera target is observed by the eye through a negative-type finder system as before and consisting of a negative field lens 10, an ocular 11, and a half-tone mirror 12 disposed between the two. In this arrangement, the reticle 13 and the corrugated pyramidal prism 26 are disposed between the mirror 17 and the projection lens 18 so that the light emanating from the camera target and striking mirror 17 illuminates the cross 14 forming a part of the reticle. This location of the reticle and prism is preferred over that shown in Fig. 1 for the reason that the positioning of the reticle and prism relative to the projection lens 18 and the ocular 11 is not dependent upon the position of the mirror 17 and is therefore less critical.

Figure 9:
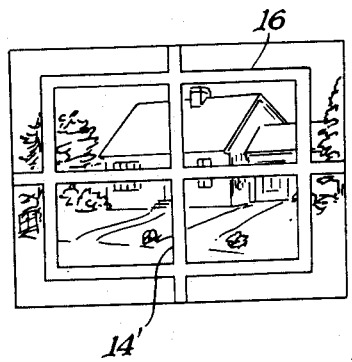
Fig. 9 illustrates the type of view which will be observed in the ocular system of Fig. 6.

As before, the corrugated pyramidal prism 26 refracts the lines of the cross and images them as a rectangle which is projected by lens 18 to the half-tone mirror with the same vergence as the image of the target formed by the negative field lens, so that the field frame appears to be at the same distance as the target and the system is parallax free. The field of view, as seen through this system, is shown in Fig. 9. As the prism is moved from the full-line position to the dotted-line position (see Fig. 6), the frame size is reduced and, hence, by setting it at any intermediate position between lens 18 and the reticle, the appropriate frame size to enclose any given field of view is obtained. While any suitable means may be used for adjusting the position of the prism, I have again shown it carried by a support 19 including a rack portion 20 engaged by a manually adjusted pinion 21.

The corrugation of the two faces of the prism causes no loss of light because the whole prism is flooded with light at all times and the rays of light striking the risers 28 of the corrugations are integrated over the surface. Nor, are the corrugations noticeable in the field of view to detract therefrom, because they are slightly removed from the plane of the reticle on which the lenses 11 and 18 in combination are focused. If the number of corrugations made in the two long prism faces is sufficient, the change in the size of the field frame upon adjustment of the prism will be continuous rather than jumpy, as it would if single plane refracting surfaces were present.

It might be pointed out that this corrugated prism is not limited to use in a finder system requiring a variable field frame. It might just as well be used in a system where a fixed frame is desired as on a camera having but a single lens, since it makes possible the imaging of a joined rectangular frame from a cross-shaped reticle, whereas a pyramidal prism having all plane faces is limited to the formation of a square field frame from a cross-shaped reticle. Inasmuch as this invention is useful with sighting finders of the telescope type where real images of the camera target are formed, as well as with negative-type systems, as described, along with the fact that it is a case of interpretation whether the refracted image formed by the pyramidal prism is real or virtual, throughout the specification and claims, I intend the word "image" to include both real and virtual where such double interpretation is possible.

Although I have shown and described certain specific embodiments of my invention, I am fully aware that many modifications thereof are possible. My invention therefore is not to be limited to the precise details of construction shown and described but is intended to cover all modifications coming within the scope of the appended claims.

Having thus described my invention, what I claim is new and desire to secure by Letters Patent of the United States is:

1. A variable field view finder for cameras comprising an optical sighting system including a front lens and an ocular for viewing an image of the camera target; a second optical system including the same ocular, an illuminated reticle in the form of a cross centered orthogonally on the optic axis of the second system, a rectangular pyramidal prism whose opposite refracting faces are symmetrical with respect to a plane through its vertex aligned on said optic axis with its vertex lying on said axis and the sides of its base parallel respectively with the two straight portions of the cross which forms the reticle and adapted to receive light from the reticle and to form a virtual rectangular image thereof; a light beam combiner for combining light from the target through the front lens and from the reticle through the prism and for directing the combined light through the common ocular; and means for axially adjusting the prism to vary the apparent size of the rectangular image to match the camera field.

2. A variable view finder according to claim 1, and in which the pyramidal prism has a square base and plane faces which make equal angles with said base whereby the frame image formed thereby is a square.

3. A variable view finder according to claim 1, and in which the pyramidal prism has a rectangular base which is longer than it is wide in the same ratio as the desired ratio of the dimensions of the field frame imaged thereby, the faces of said prism having the longest dimension being corrugated to provide a plurality of parallel plane light-refracting surfaces each making an angle with the base of the pyramid which is less than the angle made by the other two sides of the pyramid with the base as determined by the desired ratio of the dimensions of the field frame imaged thereby, whereby the four sides of the imaged field frame will appear connected at the four corners in all positions of adjustment of the prism.

4. A parallax-free, variable view finder for cameras adapted to use interchangeable objectives of different focal length and comprising a housing having two laterally spaced windows in the front wall thereof, an optical sighting system in said housing for viewing an image of the camera target including a front finder lens situated in one of said windows and an ocular in the rear wall of said housing and optically aligned with said front lens, a second optical system in said housing for forming a field frame for the sighting field and including a mirror disposed at 45° to said second window to reflect light toward said sighting system, a reticle in the form of an opaque member having a transparent cross formed in the center thereof optically aligned with said mirror, a rectangular pyramidal prism whose opposite refracting faces are symmetrical with respect to a plane through its vertex aligned on the optical axis of said mirror with the vertex lying on said optical axis and the sides of its base parallel respectively with the two straight portions of the cross which form the reticle and adapted to receive light from said reticle and to form a virtual rectangular image thereof, a half-tone mirror disposed at 45° to the intersection of the optical axes of said two systems and for combining light from the two systems and directing it to the ocular, a lens between the half-tone mirror and the prism for changing the vergence of the light from the prism to match that of the light from the target through the front finder lens, and means for axially adjusting the prism to vary the apparent size of the rectangular image in accordance with different objectives used on the camera.

5. An optical system for producing an image of a field-limiting frame which is longer than it is wide and which is variable in size, and comprising an illuminated reticle in the form of a cross, a rectangular pyramidal prism whose opposite refracting faces are symmetrical to a plane through its vertex disposed with its base orthogonal to, and its vertex lying on, and axis passing through the center of said cross and with the sides of its base parallel respectively with the two straight portions of the cross and adapted to receive light from the cross and to form a virtual rectangular image thereof, means for adjusting the prism along its axis to vary the apparent size of said rectangle, said prism having a base which is longer than it is wide in the same ratio as desired in the field-limiting frame, the two faces of said prism of the longer dimension being corrugated to provide a plurality of plane light-refracting surfaces, each making an angle with the base which is less than the angle made by the other two sides of the pyramid with the base as determined by the desired ratio of the dimensions of the field-limiting frame, whereby a jointed rectangular image is formed by the prism in all positions of adjustment thereof.

6. A view finder for cameras comprising an optical sighting system including a front lens and an ocular for viewing an image of the camera target; means for superimposing on the field of view of the sighting system a rectangular field-limiting frame which is longer in one dimension than the other and corresponds to the field of the camera, said means including a second optical system including the same ocular, an illuminated reticle in the form of a cross centered orthogonally on the optic axis of said second system, a rectangular pyramidal prism whose opposite refracting faces are symmetrical with respect to a plane through its vertex aligned on said optic axis with its vertex lying on said axis and the sides of its base parallel respectively with the two straight portions of the cross which form the reticle and adapted to receive light from the reticle and to form a virtual rectangular image thereof, said prism having a rectangular base which is longer in one dimension than the other in the same ratio as the corresponding dimensions of the camera field, the two faces of the prism having the longest dimension corrugated to provide a plurality of parallel plane light-refracting surfaces making an angle with the base of the pyramid which is less than the base angle of the other two faces of the pyramid in the same ratio as the dimensions of the camera field, said pyramidal prism spaced axially from the reticle such that the rectangular image of the reticle formed thereby corresponds to the size of the camera field, and a light beam combiner for combining light from the target through the front lens and from the reticle through the prism and for directing the combined light through the common ocular.

7. A view finder for cameras comprising an optical sighting system including a front lens and an ocular for viewing an image of the camera target, a second optical system including the same ocular, an illuminated reticle in the form of a cross centered orthogonally on the optic axis of the second system, a rectangular pyramidal prism whose opposite pairs of refracting faces have base angles which are equal to each other aligned on said optic axis with its vertex lying on said axis and the sides of its base parallel respectively with the two straight portions of the cross which forms said reticle and adapted to receive light from said reticle to form a virtual image of said cross consisting of two spaced vertical lines and two spaced horizontal lines which in combination define the boundaries of a rectangular field corresponding to that of the camera, and a light beam combiner for combining light from the target through the front lens and from the reticle through the prism and for directing the combined light through the common ocular.

8. A camera view finder according to claim 7 in which the ratio of the two dimensions of the base of the pyramidal prism is the same as the desired ratio of the dimensions of the field frame imaged thereby, the two faces of the prism having the longest dimension modified to provide plane light-refracting surfaces making an angle with the base of the pyramid which is less than the base angle of the other two faces of the pyramid in the same ratio as the dimensions of the field frame, whereby the four sides of the imaged field frame will appear connected at the four corners.

JOSEPH MIHALYI.

REFERENCES CITED

The following references are of record in the file of this patent:

UNITED STATES PATENTS

| Number | Name | Date |
|---|---|---|
| 2,166,148 | Heinisch | July 18, 1939 |
| 2,423,718 | Morrison | July 8, 1947 |

FOREIGN PATENTS

| Number | Country | Date |
|---|---|---|
| 15,708 | Great Britain | of 1915 |